US009956879B2

United States Patent
Urra et al.

(10) Patent No.: US 9,956,879 B2
(45) Date of Patent: May 1, 2018

(54) METHOD AND DEVICE FOR SUPPLYING AUXILIARY AIR TO A RAIL VEHICLE

(71) Applicant: KNORR-BREMSE SYSTEME FÜR SCHIENENFAHRZEUGE GMBH, Munich (DE)

(72) Inventors: Christian Urra, Munich (DE); Gert Assmann, Munich (DE); Thomas Kipp, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 264 days.

(21) Appl. No.: 14/914,920

(22) PCT Filed: Aug. 28, 2014

(86) PCT No.: PCT/EP2014/068216
§ 371 (c)(1),
(2) Date: Feb. 26, 2016

(87) PCT Pub. No.: WO2015/028532
PCT Pub. Date: Mar. 5, 2015

(65) Prior Publication Data
US 2016/0221447 A1    Aug. 4, 2016

(30) Foreign Application Priority Data

Aug. 30, 2013 (DE) .................. 10 2013 109 475

(51) Int. Cl.
| | |
|---|---|
| *B60L 5/32* | (2006.01) |
| *B60T 13/66* | (2006.01) |
| *B60T 17/02* | (2006.01) |
| *B60T 17/22* | (2006.01) |
| *B60L 5/28* | (2006.01) |

(Continued)

(52) U.S. Cl.
CPC .............. *B60L 5/32* (2013.01); *B60L 1/003* (2013.01); *B60L 5/28* (2013.01); *B60T 11/10* (2013.01);
(Continued)

(58) Field of Classification Search
CPC .......... B60T 17/02; B60T 13/36; B60T 13/74; B60T 17/228; B60L 5/28; B60L 4/32; F16B 11/06; F16B 2211/8855
See application file for complete search history.

(56) References Cited

FOREIGN PATENT DOCUMENTS

| AT | 388900 B | 9/1989 |
|---|---|---|
| CN | 101432162 A | 5/2009 |

(Continued)

OTHER PUBLICATIONS

Search Report for German Patent Application No. 10 2013 109 475.9; dated Apr. 14, 2014.

(Continued)

*Primary Examiner* — F. Daniel Lopez
*Assistant Examiner* — Daniel Collins

(57) ABSTRACT

A compressed air supply device for a rail vehicle, having a main compressor for generating compressed air for a pneumatic brake system and a vehicle battery for supplying electric energy. The compressed air generator for supplying additional auxiliary air for operating at least one pneumatic actuator is provided in a frame of an adjusting drive for a pantograph. The compressed air generator for supplying auxiliary air includes an electric frequency converter for operating the electric-motor driven main compressor of the rail vehicle with low rotational speed from the electric drive energy provided by the vehicle battery. A secondary line is attached to the compressed air line connected to the main compressor to branch off the auxiliary air for the supply of auxiliary air of the actuator.

8 Claims, 2 Drawing Sheets

(51) Int. Cl.
*B60T 11/10* (2006.01)
*B60T 13/74* (2006.01)
*B61H 13/20* (2006.01)
*B60L 1/00* (2006.01)

(52) U.S. Cl.
CPC ............ *B60T 13/665* (2013.01); *B60T 13/74* (2013.01); *B60T 17/02* (2013.01); *B60T 17/228* (2013.01); *B61H 13/20* (2013.01); *B60L 2200/26* (2013.01); *B60T 2260/00* (2013.01)

(56) References Cited

FOREIGN PATENT DOCUMENTS

| CN | 202186293 U | | 4/2012 | |
|---|---|---|---|---|
| DE | 2800877 A1 | | 7/1978 | |
| DE | 10126042 A1 | | 1/2002 | |
| DE | 102008011831 A1 | | 9/2009 | |
| GB | 1562673 | * | 12/1980 | ................ B60L 5/32 |
| JP | S63274303 A | | 11/1988 | |
| JP | H10323532 A | | 12/1998 | |
| JP | 2011004566 A | | 1/2011 | |
| JP | 2012245949 A | | 12/2012 | |

OTHER PUBLICATIONS

Search Report for International Patent Application No. PCT/EP2014/068216; dated Sep. 7, 2015.
Japanese Office Action for corresponding application 2016-537288 dated Feb. 14, 2017.
Chinese Office Action for corresponding application 201480047707.6 dated Nov. 28, 2016.

* cited by examiner

METHOD AND DEVICE FOR SUPPLYING AUXILIARY AIR TO A RAIL VEHICLE

PRIORITY CLAIM

This patent application is a U.S. National Phase of International Patent Application No. PCT/EP2014/068216, filed 28 Aug. 2014, which claims priority to German Patent Application No. 10 2013 109 475.9, filed 30 Aug. 2013, the disclosures of which are incorporated herein by reference in their entirety.

FIELD

Illustrative embodiments relate to a compressed-air supply device of a rail vehicle, having a main compressor for generating compressed air for a pneumatic brake system, and having a vehicle battery for the supply of electrical energy, wherein compressed-air generating means are provided for the additional auxiliary-air supply for the operation of at least one pneumatic actuator in the context of an actuating drive for a pantograph. Illustrative embodiments also relate to a method for operating a compressed-air supply device of the type, and to a rail vehicle that is equipped with the compressed-air supply device.

BACKGROUND

The field of use extends to rail vehicle engineering. Rail vehicles that are equipped with pantographs for drawing electrical current require auxiliary energy to move the pantograph, by way of an actuating drive, between a retracted position and a deployed position. As actuating drives of the type of interest here, use is made of pneumatic actuators, for example pressure medium cylinders, which must be supplied with auxiliary energy, i.e., compressed air.

According to the generally known prior art, for the auxiliary-air supply, a separate auxiliary-air compressor is used which, in the context of an auxiliary-air supply system for providing the pneumatic energy for the actuating drive of a pantograph and the like, is supplied with electrical energy by the vehicle battery of the rail vehicle. The electrical energy of the vehicle battery is sufficient to drive the auxiliary air compressor, which is of relatively small dimensions, by way of an electric motor such that an adequate amount of compressed air can be produced for auxiliary-air supply purposes.

However, an auxiliary-air supply system of the type entails an extremely high level of outlay in terms of apparatus and maintenance despite a low level of usage in the normally weekly cycle.

Disclosed embodiments provide a compressed-air supply device having compressed-air generating means for the additional auxiliary-air supply, which compressed-air supply device is a simple technical construction and low maintenance outlay.

BRIEF DESCRIPTION OF THE FIGURES

Exemplary embodiments will be discussed in more detail below with reference to the appended drawings, in which.

DETAILED DESCRIPTION OF THE DISCLOSED EMBODIMENTS

Disclosed embodiments encompass the technical teaching that the compressed-air generating means for the auxiliary-air supply comprise an electrical frequency inverter for the operation of the electric motor-driven main compressor of the rail vehicle at low rotational speed using electrical drive energy provided from the vehicle battery, wherein, to the compressed-air line which is connected to the main compressor, there is attached a secondary line for auxiliary air for the auxiliary-air supply to the actuator to be branched off from the compressed-air line.

Additional components of an auxiliary-air supply arrangement, such as an auxiliary-air compressor and the electrical and pneumatic connections thereof, can be omitted. Since the disclosed solution is a compact structural form, it is furthermore possible for a corresponding amount of structural space to be saved. This is because, for the disclosed solution, it is merely necessary for an additional electrical frequency inverter to be jointly integrated into the electrical architecture of the rail vehicle, which frequency inverter must be electrically connected to the drive of the main compressor. The secondary line that branches off from the compressed-air line of the compressor can likewise be laid, with little installation outlay, to the control valve of the pneumatic actuator, which serves as actuating drive, for the movement of the pantograph.

In at least one disclosed embodiment, downstream of the main compressor, there is connected an adsorption-type air dryer or other suitable air dryer, from the outlet-side compressed-air line of which the secondary line branches off for the attachment of the auxiliary air circuit. The compressed-air line may issue into a downstream feed pressure vessel. An efficient extraction of the auxiliary air is possible at this specific location of the compressed-air line.

Furthermore, a minimum-pressure valve may be arranged in the compressed-air line in the region between the air dryer and the feed pressure vessel. The minimum-pressure valve should then be incorporated with its blocking direction oriented toward the air dryer, and in this specific embodiment, the secondary line branches off from the compressed-air line in the region between the adsorption-type air dryer and the minimum-pressure valve. In this way, the auxiliary-air supply can be ensured, and charging of the feed pressure vessel takes place only above the set minimum pressure, this taking place above 4 bar, optionally above 8 bar.

Figure 1:
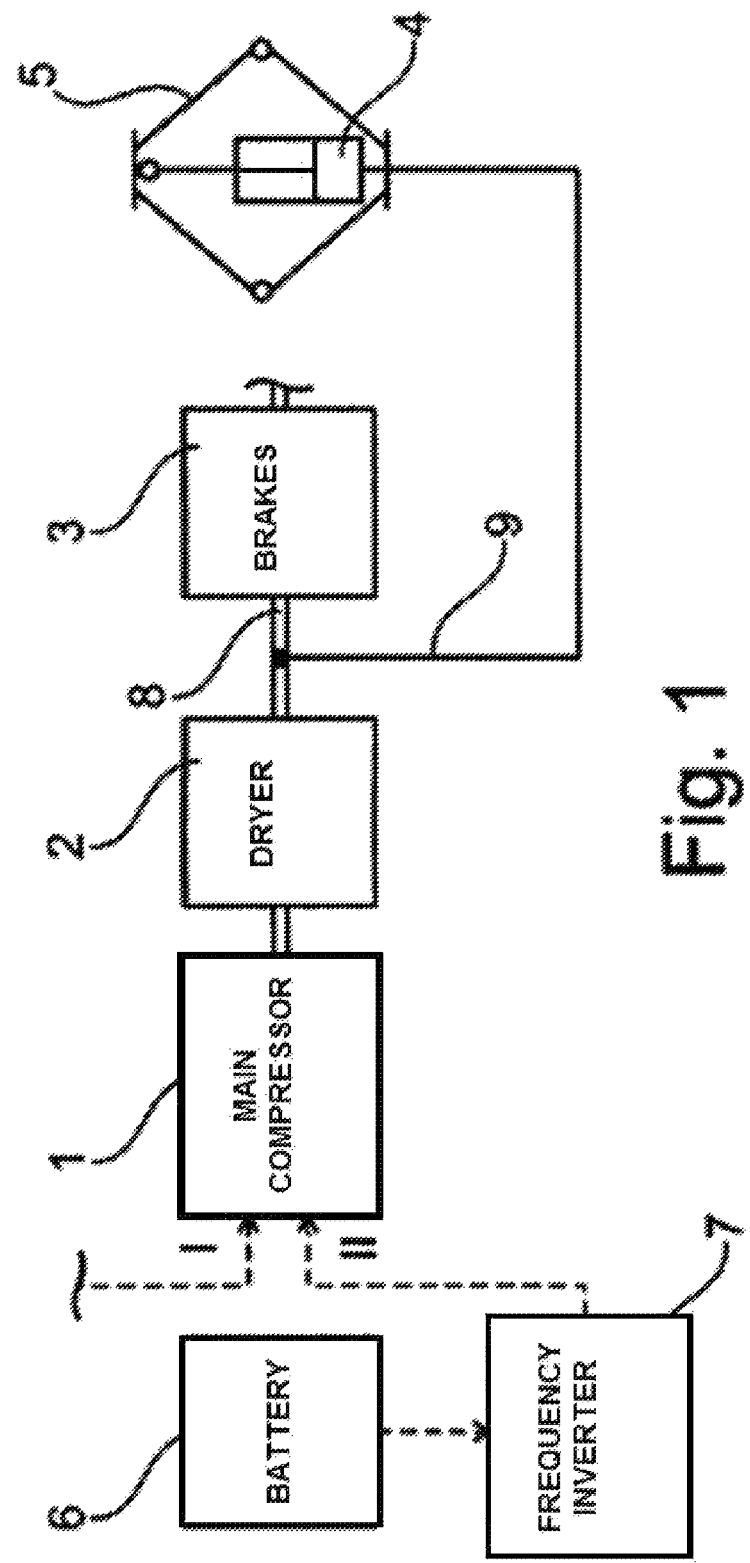
FIG. 1 is a schematic illustration of a compressed-air supply device, integrated in a rail vehicle, with additional auxiliary-air supply means.

As per FIG. 1, a main compressor 1 is used for generating compressed air for a pneumatic brake system of a rail vehicle (not illustrated in any more detail). The main compressor 1 is supplied with electrical energy, and driven by electric motor, by way of a first electrical terminal I. The compressed air generated by the main compressor 1 passes through an adsorption-type air dryer 2, downstream of which there is connected a feed pressure vessel 3. The pneumatic brake system of the rail vehicle is fed from the feed pressure vessel 3.

Furthermore, compressed-air generating means are provided for the additional auxiliary-air supply for the operation of a pneumatic actuator 4 in the context of an actuating drive for a pantograph 5. For this purpose, electrical energy is drawn from the vehicle battery 6, the electrical energy being conducted via an electrical frequency inverter 7 for the electric motor-driven main compressor 1 of the rail vehicle to be driven at low rotational speed, using electrical energy provided from the vehicle battery 6, by way of a second electrical terminal II. In this way, the main compressor 1 runs with a relatively low level of delivery power which is however adequate for the auxiliary-air supply, and the delivered compressed air is, after passing through the adsorption-type air dryer 2, conducted into the outlet-side compressed-air line 8. From here, a secondary line 9 branches off to conduct onward the auxiliary air for the auxiliary-air supply to the actuator 4.

Figure 2:
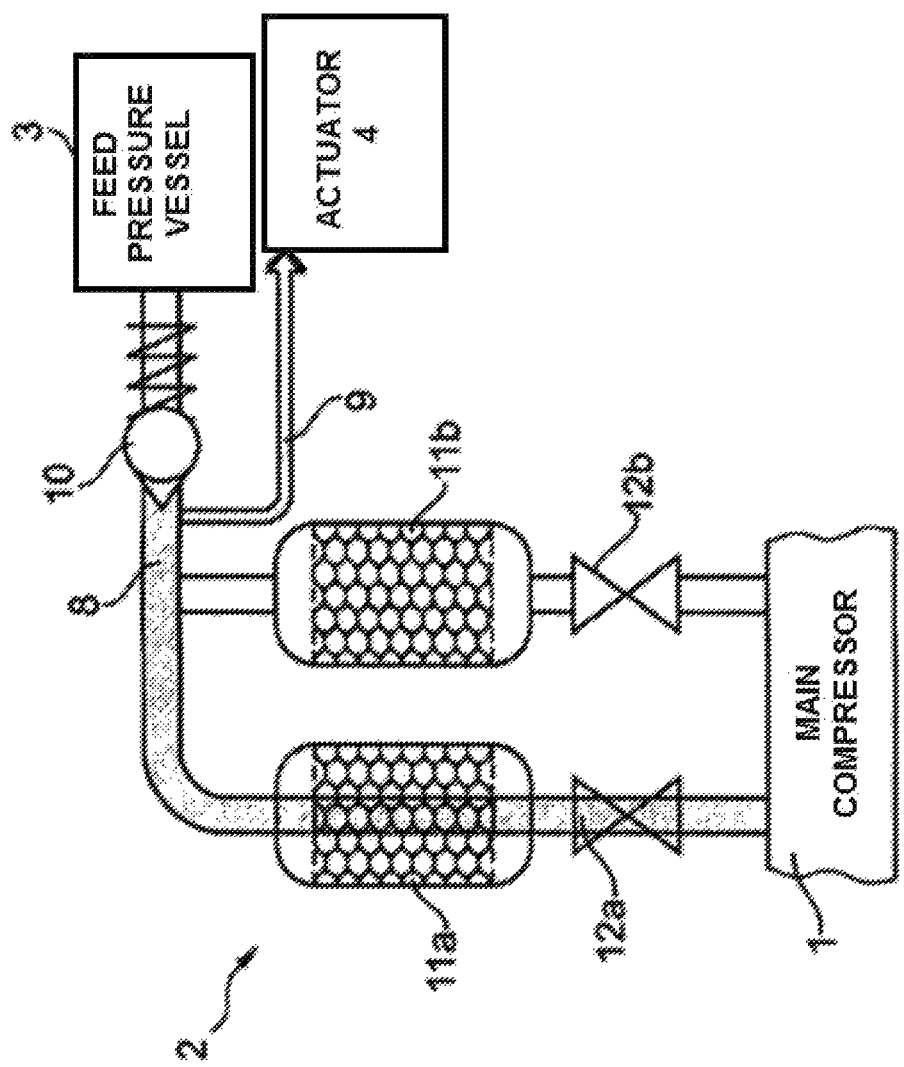
FIG. 2 is a schematic illustration of the extraction of auxiliary air from the compressed-air line of the main compressor.

As per FIG. 2, in the compressed-air line 8 in the region between the adsorption-type air dryer 2 and the feed pressure vessel 3, a minimum-pressure valve 10 is arranged with its blocking direction oriented toward the adsorption-type air dryer 2. The secondary line 9 is branched off from the compressed-air line 8 in the region between the adsorption-type air dryer 2 and the minimum-pressure valve 10 to prevent the auxiliary-air supply from being subjected to load by compressed air situated in the feed pressure vessel 3.

The adsorption-type air dryer 2 is, in this exemplary embodiment, formed in the manner of a two-chamber dryer and accordingly comprises two drying vessels 11*a* and 11*b* which can be operated alternately in a drying phase and in a regeneration phase in a generally known manner. For this purpose, a switchover is performed by way of valves 12*a* and 12*b*.

LIST OF REFERENCE DESIGNATIONS

1 Main compressor
2 Adsorption-type air dryer
3 Feed pressure vessel
4 Actuator
5 Pantograph
6 Vehicle battery
7 Frequency inverter
8 Compressed-air line
9 Secondary line
10 Minimum-pressure valve
11 Drying vessel
12 Valve

The invention claimed is:

1. A compressed-air supply device of a rail vehicle, comprising:
    an electric motor-driven main compressor for generating compressed air for a pneumatic brake system; and
    a vehicle battery for the supply of electrical energy; and
    an electrical frequency inverter for operation of the electric motor-driven main compressor of the rail vehicle at low rotational speed using electrical drive energy provided from the vehicle battery to provide additional auxiliary air supply for operation of at least one pneumatic actuator in the context of an actuating drive for a pantograph,
    wherein a secondary line is connected to a compressed-air line connected to the electric motor-driven main compressor so as to provide auxiliary air for the auxiliary-air supply to the actuator to be branched off from the compressed-air line.

2. The compressed-air supply device of claim 1, wherein, an adsorption air dryer is connected downstream of the electric motor-driven main compressor from an outlet-side of the compressed-air line of which the secondary line branches off.

3. The compressed-air supply device of claim 1, wherein the compressed-air line issues into a feed pressure vessel.

4. The compressed-air supply device of claim 2, wherein, in the compressed-air line in the region between adsorption air dryer and feed pressure vessel, a minimum-pressure valve is arranged with its blocking direction oriented toward the adsorption air dryer, wherein the secondary line branches off from the compressed-air line in the region between the adsorption air dryer and the minimum-pressure valve.

5. The compressed-air supply device of claim 4, wherein the minimum-pressure valve opens above a pressure of 4 bar.

6. The compressed-air supply device of claim 1, wherein the adsorption air dryer is formed as a two-chamber dryer and comprises two drying vessels which can be operated alternately in a drying phase and in a regeneration phase.

7. A method for operating a compressed-air supply device, wherein compressed air for a pneumatic brake system is generated by a main compressor, and electrical energy is provided by a vehicle battery, and at least one pneumatic actuator in the context of an actuating drive for a pantograph is supplied with auxiliary air,
    wherein, for the auxiliary-air supply, the electric motor-driven main compressor of the rail vehicle is operated at low rotational speed by an electrical frequency inverter using electrical drive energy provided from the vehicle battery, wherein the auxiliary air is branched off, by a secondary line, from a compressed-air line attached to the main compressor.

8. A rail vehicle having at least one pantograph, the actuating drive of which is at least one pneumatic actuator to which compressed air is supplied by a compressed-air supply device as claimed in claim 1.

* * * * *